(12) United States Patent
Sakamoto

(10) Patent No.: US 8,027,098 B2
(45) Date of Patent: Sep. 27, 2011

(54) FOCUS LENS APPARATUS

(75) Inventor: Masayuki Sakamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/560,741

(22) Filed: Sep. 16, 2009

(65) Prior Publication Data

US 2010/0067121 A1    Mar. 18, 2010

(30) Foreign Application Priority Data

Sep. 18, 2008 (JP) ................................ 2008-239566

(51) Int. Cl.
*G02B 15/14* (2006.01)
*G02B 7/02* (2006.01)
(52) U.S. Cl. .................... 359/694; 359/698; 359/822
(58) Field of Classification Search .......... 359/694–700, 359/811–824; 396/79, 80; 348/222.1, 335, 348/345, 354

See application file for complete search history.

(56) References Cited

U.S. PATENT DOCUMENTS

| 5,161,026 A * | 11/1992 | Mabuchi et al. ........... 348/222.1 |
| 5,486,860 A | 1/1996 | Shiokawa et al. |
| 7,692,873 B2 * | 4/2010 | Okawara ...................... 359/696 |
| 2002/0047912 A1 * | 4/2002 | Mabuchi et al. .............. 348/345 |

FOREIGN PATENT DOCUMENTS

JP    2004-117439 A    4/2004

* cited by examiner

*Primary Examiner* — Mohammed Hasan

(74) *Attorney, Agent, or Firm* — Canon U.S.A., Inc. I.P. Division

(57) ABSTRACT

Provided is a zoom lens including: a focus lens unit which moves during focusing; and a magnification-varying lens unit which moves during zooming, in which when the magnification-varying lens unit is moved in a direction in which a depth of focus deepens, a focus operation using the focus lens unit is stopped.

12 Claims, 8 Drawing Sheets

FOCUS LENS APPARATUS

BACKGROUND OF THE INVENTION

1. Field of the Invention

The present invention relates to a focus lens apparatus which performs a focus operation with a depth of focus taken into account.

2. Description of the Related Art

In a conventional autofocus system, as described in U.S. Pat. No. 5,486,860, a focus adjustment is performed on all subjects within an area for recognizing the focus state to continuously maintain an in-focus state. Therefore, the focus adjustment is performed to maintain the focus state during a zooming operation of a zoom lens.

When the focus adjustment is to be performed on a specific subject among multiple subjects located within a screen at a wide-angle end, it is difficult to perform a high-precision focus adjustment on the specific subject due to the deep depth of focus.

The conventional autofocus system performs a focus adjustment to maintain the in-focus state averagely for all the subjects within the area for recognizing the focus state. Therefore, if multiple subjects are within the area for recognizing the focus state, it is difficult to perform the focus adjustment particularly on the specific subject among the subjects.

A high-precision focus adjustment may be automatically performed in a case in which only a specific subject can be captured within the area for recognizing the focus state by use of a telephoto side of the zoom lens. However, when the zoom lens is moved to a wide-angle side, the focus adjustment is performed again, and hence the focus adjustment cannot be performed on the specific subject similarly.

SUMMARY OF THE INVENTION

It is an object of the present invention to solve the problems described above and to provide a focus lens apparatus capable of performing a high-precision focus adjustment on a specific subject intended by an image-taking person.

In order to achieve the object described above, a focus lens apparatus according to the present invention includes: a focus lens unit which moves during focusing; and a magnification-varying lens unit which moves during zooming, in which when the magnification-varying lens unit is moved in a direction in which a depth of focus deepens, a focus operation using the focus lens unit is stopped.

Further features of the present invention will become apparent from the following description of exemplary embodiments with reference to the attached drawings.

DESCRIPTION OF THE EMBODIMENTS

The present invention is described in detail with reference to embodiments illustrated in the attached drawings.

Embodiment 1

Figure 1:
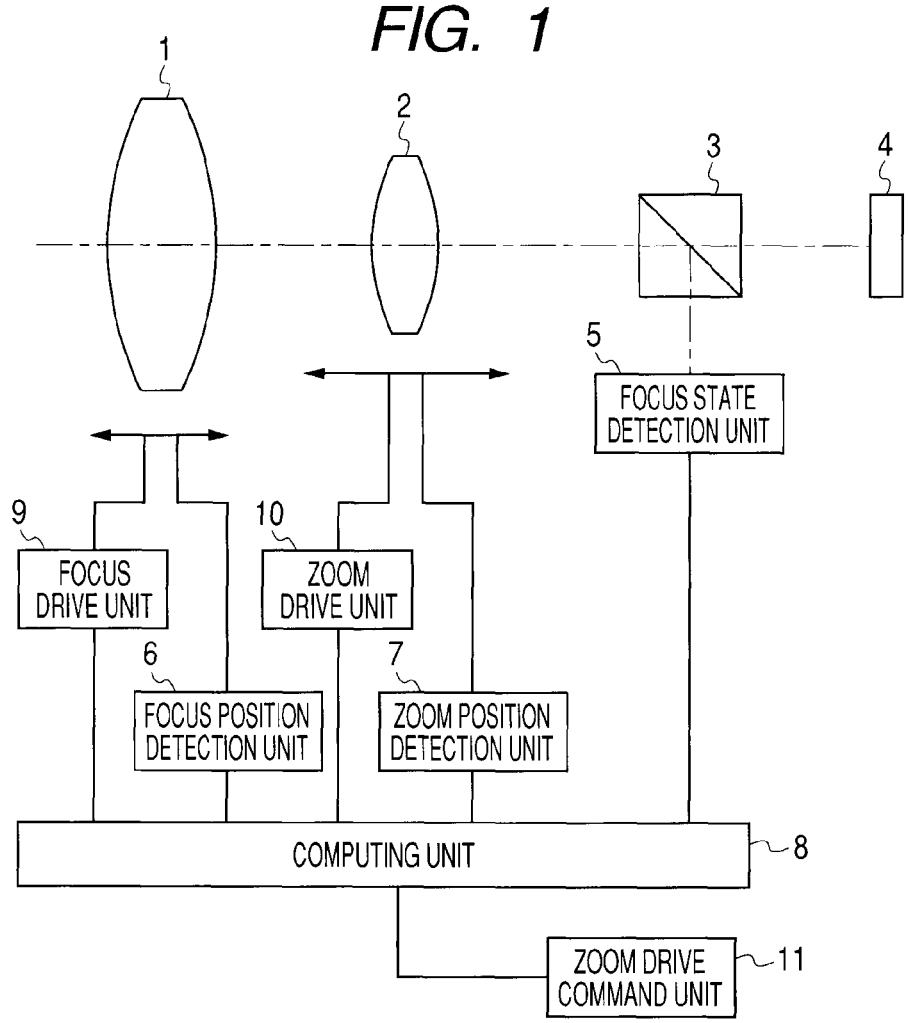
FIG. 1 is a block circuit structural diagram illustrating Embodiment 1 of the present invention.

FIG. 1 is a block circuit structural diagram illustrating an optical system and a control system in a zoom lens having an autofocus function according to Embodiment 1. A focus lens unit 1 which moves during focusing, a magnification-varying lens unit 2 which moves during zooming, and a separation optical system 3 are provided on an optical axis of the zoom lens. An image pickup unit 4 is provided in a transmission direction of the separation optical system 3. A focus state detection unit 5 is provided in a reflection direction of the separation optical system 3. A position of the focus lens unit 1 and a position of the magnification-varying lens unit 2 are detected by a focus position detection unit 6 and a zoom position detection unit 7, respectively. An output of the focus position detection unit 6, an output of the zoom position detection unit 7, and an output of the focus state detection unit 5 are connected to a computing unit 8. Outputs of the computing unit 8 are connected to a focus drive unit 9 and a zoom drive unit 10. The focus lens unit 1 and the magnification-varying lens unit 2 are driven by the focus drive unit 9 and the zoom drive unit 10, respectively. The computing unit 8 is connected to an output of a zoom drive command unit 11.

A beam having passed through the focus lens unit 1 passes the magnification-varying lens unit 2. The beam is separated by the separation optical system 3 into two beams, a transmission beam and a reflection beam. The transmission beam is guided to the image pickup unit 4. The reflection beam is guided to the focus state detection unit 5. Note that the transmission beam may be guided to the focus state detection unit and the reflection beam may be guided to the image pickup unit.

The focus state detection unit 5 may detect (recognize) a focus state indicating a state of a focus point of the image pickup unit 4 based on the above-mentioned reflection beam. A result obtained by the detection is used to drive the focus lens unit 1, to thereby adjust a focus point of an image formed on the image pickup unit 4.

The computing unit 8 computes an amount of movement of the focus lens unit 1 to obtain a desired focus state of the image pickup unit 4, based on the focus state obtained by the focus state detection unit 5. The computing unit (control unit) controls the focus drive unit 9 based on the amount of movement to move the focus lens unit 1, to thereby adjust the focus state. The focus position detection unit 6 detects the position of the focus lens unit 1 and feeds back, to the computing unit 8, a result obtained by detecting the position of the focus lens unit 1.

The zoom position detection unit 7 detects the position of the magnification-varying lens unit 2. The zoom drive unit 10 drives the magnification-varying lens unit 2 in response to a command from the computing unit 8. In this way, a magnification of the image formed on the image pickup unit 4 (focal length of zoom lens) may be adjusted. The computing unit 8 controls the zoom drive unit 10 in response to an instruction (command) from the zoom drive command unit 11 operated by an image-taking person.

Figure 2:
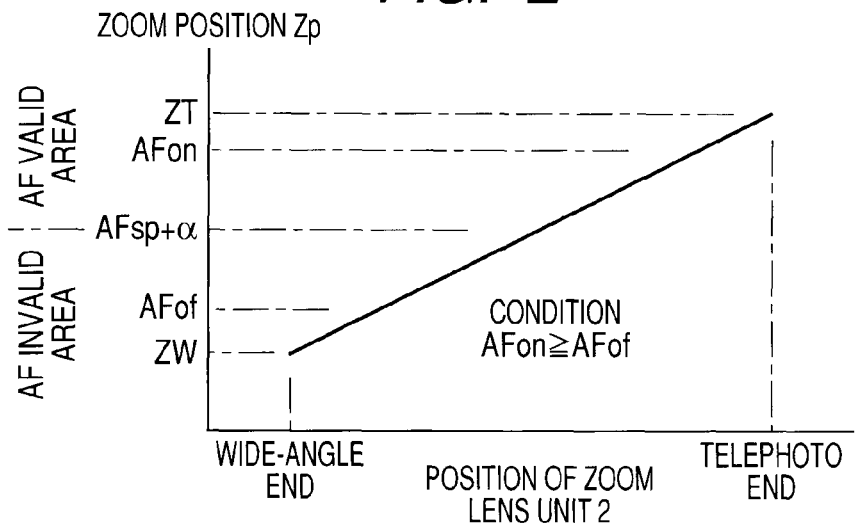
FIG. 2 is an explanatory diagram illustrating an autofocus state according to Embodiment 1 of the present invention.

FIG. 2 illustrates an autofocus (AF) state. When the magnification-varying lens unit 2 is moved from a wide-angle end to a telephoto end, a zoom position Zp is changed from a wide-angle end ZW to a telephoto end ZT. The zoom position Zp is a value input to the computing unit 8 through the zoom position detection unit 7. The zoom position Zp becomes a larger value as the magnification is shifted to a telephoto side. The zoom position Zp becomes a smaller value as the magnification is shifted to a wide-angle side. In general, a depth of focus shallows as the zoom position Zp is moved to the telephoto side, and deepens as the zoom position Zp is moved to the wide-angle side.

When the zoom position Zp is larger than an AF valid position AFon which is a predetermined threshold value, the autofocus operation (focus operation, AF operation) is always valid. When the zoom position Zp is smaller than an AF invalid position AFof which is a predetermined threshold value, the autofocus operation is always invalid. Note that the AF valid position AFon and the AF invalid position AFof are arbitrary values satisfying a condition of AFon≧AFof.

When the zoom position Zp is larger than "(AF stop position AFsp)+(AF stop dead zone α)", the autofocus operation is valid. When the zoom position Zp is not larger than "(AF stop position AFsp)+(AF stop dead zone α)", the autofocus operation is invalid. Note that the AF stop position AFsp and the AF stop dead zone α are variables. The AF stop dead zone α is a dead zone for preventing the frequent change between validity and invalidity of the autofocus operation. An AF valid stop dead zone αon which is substituted for the AF stop dead zone α when the AF operation is valid and an AF invalid stop dead zone αof which is substituted for the AF stop dead zone α when the AF operation is invalid are predetermined values.

Figure 3:
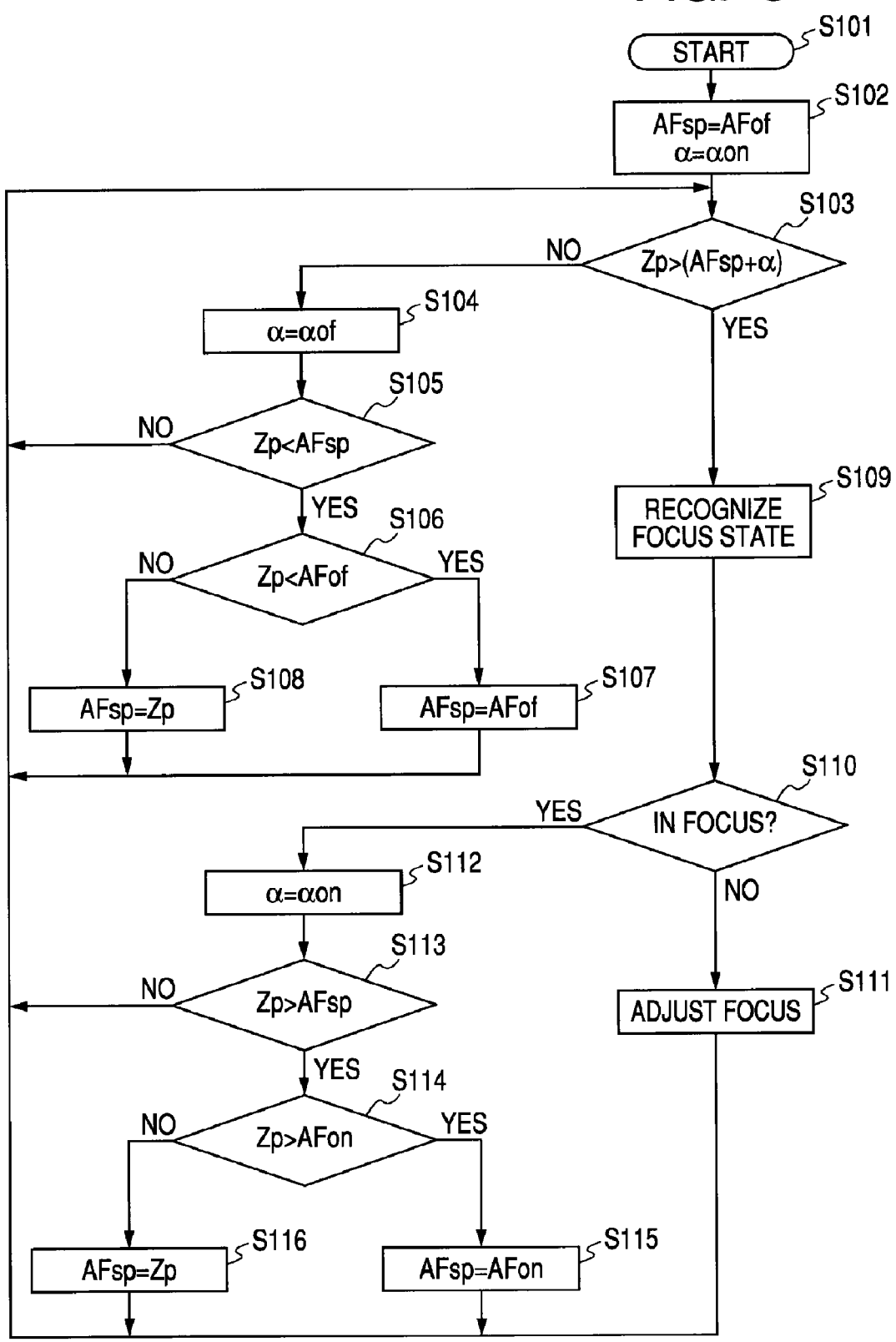
FIG. 3 is an operational flowchart illustrating Embodiment 1 of the present invention.

FIG. 3 is a flowchart illustrating an operation of the computing unit 8. The computing unit 8 starts to operate in Step S101. In Step S102, the AF invalid position AFof is set as the AF stop position AFsp and the AF valid stop dead zone αon is set as the AF stop dead zone α. Next, processing of Step S103 is executed. In Step S103, the zoom position Zp is compared with "(AF stop position AFsp)+(AF stop dead zone α)". When the zoom position Zp is larger than "(AF stop position AFsp)+(AF stop dead zone α)", a focus state recognition operation is executed in Step S109. When the zoom position Zp is not larger than "(AF stop position AFsp)+(AF stop dead zone α)", focusing is invalid and processing of Step S104 is executed.

In Step S109, the focus state input from the focus state detection unit 5 is recognized. Next, when it is determined in Step S110 that a focus point is not in focus, processing of Step S111 is executed. When the focus point is in focus, processing of Step S112 is executed. In Step S111, the focus lens unit 1 is driven for autofocus operation to adjust the focus point. Then, the processing returns to Step S103 and is repeated.

In Step S112, the AF valid stop dead zone con is set as the AF stop dead zone α. Next, in Step S113, the zoom position Zp is compared with the AF stop position AFsp. When the zoom position Zp is not larger than the AF stop position AFsp, the processing returns to Step S103 and is repeated. When the zoom position Zp is larger than the AF stop position AFsp, that is, when the zoom position Zp is shifted to the telephoto side, processing of Step S114 is executed to update the AF stop position AFsp.

In Step S114, the zoom position Zp is compared with the AF valid position AFon. When the zoom position Zp is not larger than the AF valid position AFon, the zoom position Zp is set as the AF stop position AFsp in Step S116, and then the processing returns to Step S103 and is repeated. When the zoom position Zp is larger than the AF valid position AFon, the AF valid position AFon is set as the AF stop position AFsp in Step S115, and then the processing returns to Step S103 and is repeated. Note that there is a relationship, AFsp≧AFon.

In Step S104, the AF invalid stop dead zone αof is set as the AF stop dead zone α. Next, in Step S105, the zoom position Zp is compared with the AF stop position AFsp. When the zoom position Zp is not smaller than the AF stop position AFsp, the processing returns to Step S103 and is repeated. When the zoom position Zp is smaller than the AF stop position AFsp, that is, when the zoom position Zp is shifted to the wide-angle side, processing of Step S106 is executed to update the AF stop position AFsp.

In Step S106, the zoom position Zp is compared with the AF invalid position AFof. When the zoom position Zp is not smaller than the AF invalid position AFof, the zoom position Zp is set as the AF stop position AFsp in Step S108, and then the processing returns to Step S103 and is repeated. When the zoom position Zp is smaller than the AF invalid position AFof, the AF invalid position AFof is set as the AF stop position AFsp in Step S107, and then the processing returns to Step S103 and is repeated. Note that there is a relationship, AFsp≧AFof.

In other words, when the autofocus operation is determined valid in Step S103, the AF valid stop dead zone αon is set as the AF stop dead zone α in Step S112. When the autofocus operation is determined invalid in Step S103, the AF invalid stop dead zone αof is set as the AF stop dead zone α in Step S104.

In Step S113 subsequent to Step S112, when the zoom position Zp is shifted to a position closer to the telephoto side with respect to the AF stop position AFsp while the autofocus operation is valid, the AF stop position AFsp is reset as the zoom position Zp. Note that, when the zoom position Zp exceeds the AF valid position AFon, the AF stop position AFsp becomes the AF valid position AFon.

In Step S105 subsequent to Step S104, when the zoom position Zp is shifted to a position closer to the wide-angle side with respect to the AF stop position AFsp while the autofocus operation is invalid, the AF stop position AFsp is reset as the zoom position Zp. Note that, when the zoom position Zp is smaller than the AF invalid position AFof, the AF stop position AFsp becomes the AF invalid position AFof.

As described above, according to the zoom lens of this embodiment, when the magnification-varying lens unit is moved to the telephoto side (zoom lens is zoomed to the telephoto side), the focus adjustment (autofocus operation) is performed, whereas when the magnification-varying lens unit is moved to the wide-angle side (zoom lens is zoomed to the wide-angle side), the focus adjustment (autofocus operation) is not performed.

In other words, in the case of the zoom lens having the autofocus function (AF function), when zooming is performed in a direction in which the depth of focus deepens (when magnification-varying lens unit is moved in direction in which focal length shortens or when magnification-varying lens unit is moved to wide-angle side), the autofocus function is temporarily stopped (autofocus operation is made invalid or disabled). Therefore, even when multiple subjects are within an image taking area for recognizing the focus state, the focus state on a specific subject may be maintained.

In contrast, when zooming is performed in a direction in which the depth of focus shallows (when magnification-varying lens unit is moved in direction in which focal length lengthens or when magnification-varying lens unit is moved to telephoto side), the focus adjustment (autofocus operation) is performed (restarted). Therefore, the telephoto side on which the depth of focus shallows, of the magnification-varying lens unit 2 using the autofocus system may be employed to perform a high-precision focus adjustment on the specific subject intended by an image-taking person.

The zoom lens according to Embodiment 1 of the present invention has the structure described above, and hence there is an effect that focusing can be prevented from being performed on a subject which is not intended by the image-taking person while high-precision focusing can be performed on a subject intended by the image-taking person.

The phrase "the depth of focus is deep or shallow" described herein is relative. In other words, the depth of focus of the entire zoom lens gradually deepens (increases) as the magnification-varying lens unit is shifted to the wide-angle side. This case represents that the magnification-varying lens unit moves in the direction in which the depth of focus (relatively) deepens. In contrast, the depth of focus of the entire zoom lens gradually shallows (reduces) as the magnification-varying lens unit is shifted to the telephoto side. This case represents that the magnification-varying lens unit moves in the direction in which the depth of focus (relatively) shallows.

In Embodiment 1 and other embodiments of the present invention, a drive command value (such as position command, speed command, or acceleration command) for the magnification-varying lens unit or a result obtained by detecting a position of the magnification-varying lens unit may be used to determine the position of the magnification-varying lens unit (to determine whether the position of the magnification-varying lens unit is shifted in direction in which depth of focus deepens or direction in which depth of focus shallows). In addition to such a method, a method of determining whether the depth of focus deepens or shallows may be employed.

In Embodiment 1 of the present invention, the zoom position Zp is used to determine whether the autofocus operation is valid or invalid (to determine whether driving of focus lens is enabled or disabled). However, the present invention is not limited to this. For example, even when the zoom position Zp and a field angle, focal length, or sensitivity of the magnification-varying lens unit 2 which may be obtained from the focus position are used, the same effect can be obtained.

Embodiment 2

Figure 4:
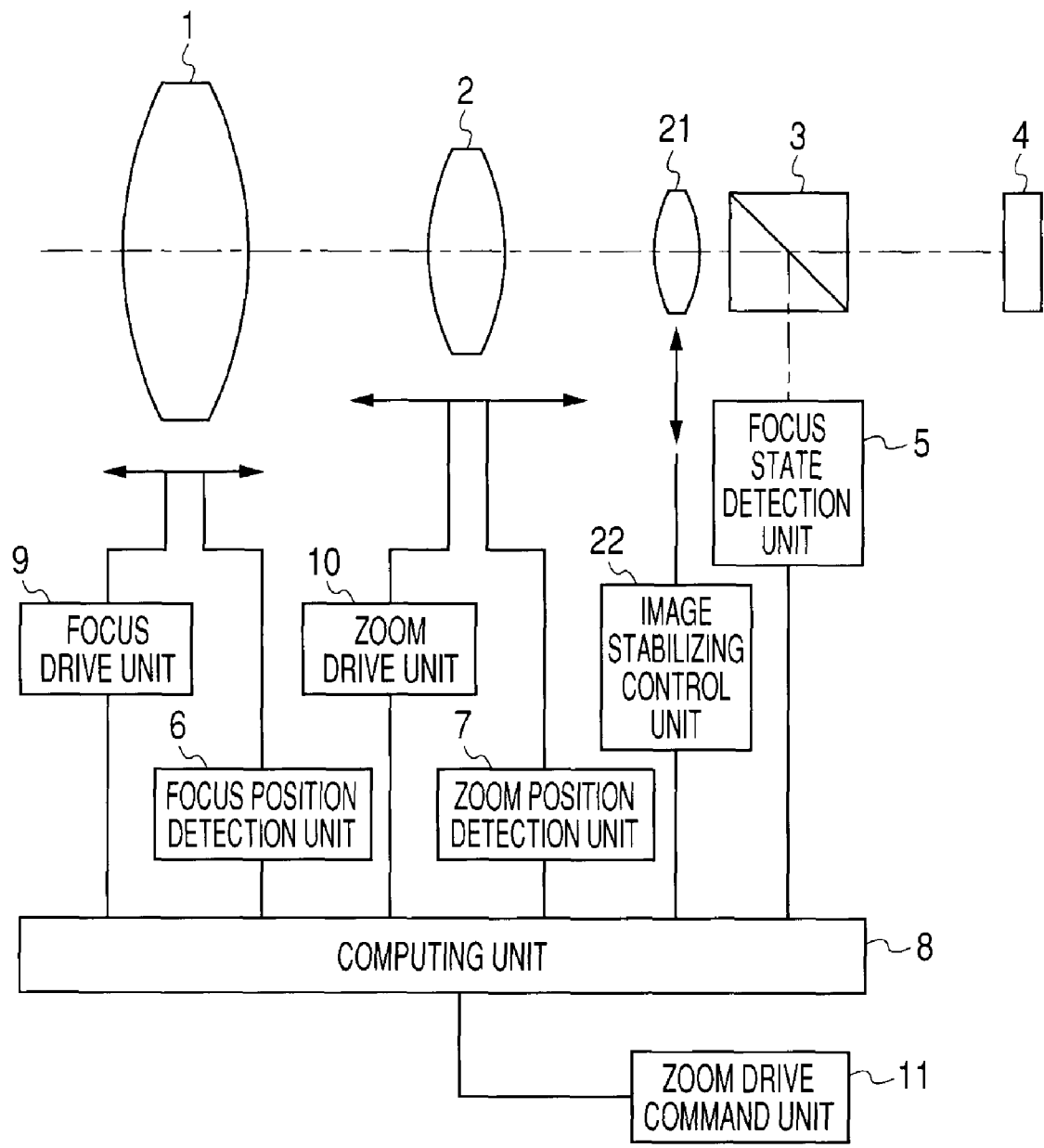
FIG. 4 is a block circuit structural diagram illustrating Embodiment 2 of the present invention.

FIG. 4 is a block circuit structural diagram illustrating an optical system and a control unit according to Embodiment 2. Unlike FIG. 1, an image stabilizing lens 21 is provided between the magnification-varying lens unit 2 and the separation optical system 3. An output of the computing unit 8 is connected to the image stabilizing lens 21 through an image stabilizing control unit 22. A beam passes through the focus lens unit 1, the magnification-varying lens unit 2, and the image stabilizing lens 21.

The image stabilizing control unit 22 may remove an influence of a micro-vibration of the magnification-varying lens unit 2 on an image formed on the image pickup unit 4 to stabilize the image and may also detect a vibration due to a panning operation in which the magnification-varying lens unit 2 significantly moves. By recognizing the panning operation by detecting the vibration, it is determined that the specific subject intended by the image-taking person is changed.

Figure 5:
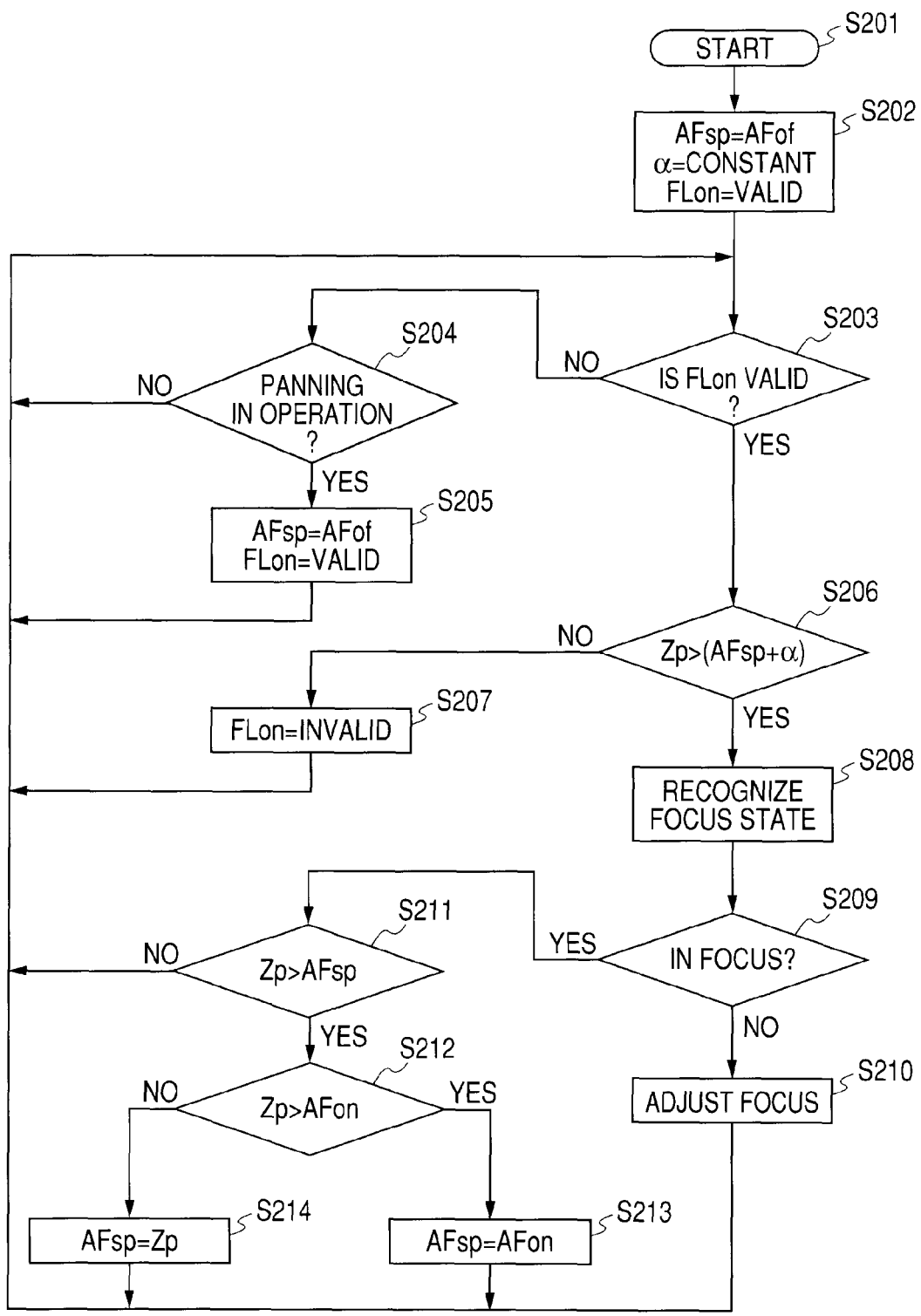
FIG. 5 is an operational flowchart illustrating Embodiment 2 of the present invention.

FIG. 5 is a flowchart illustrating an operation of the computing unit 8 according to Embodiment 2. According to the computing unit 8, in Step S202, the AF invalid position AFof is set as the AF stop position AFsp, a constant is set as the AF stop dead zone α, and an AF valid flag FLon is set to be valid.

When the AF valid flag FLon is valid in Step S203, processing of Step S206 is executed. When the AF valid flag FLon is not valid, processing of Step S204 is executed. In Step S206, the zoom position Zp is compared with "(AF stop position AFsp)+(AF stop dead zone α)". When the zoom position Zp is larger than "(AF stop position AFsp)+(AF stop dead zone α)", processing of Step S208 is executed. When the zoom position Zp is smaller than "(AF stop position AFsp)+(AF stop dead zone α)", processing of Step S207 is executed.

In Step S208, the focus state obtained from the focus state detection unit 5 is recognized. Then, when it is determined in Step S209 that the focus point is in focus, processing of Step S211 is executed. When the focus point is not in focus, processing of Step S210 is executed. In Step S210, the focus lens unit 1 is driven for autofocus operation to adjust the focus point. Then, the processing returns to Step S203 and is repeated.

In Step S211, the zoom position Zp is compared with the AF stop position AFsp. When the zoom position Zp is not greater than the AF stop position AFsp, the processing returns to Step S203 and is repeated. When the zoom position Zp is larger than the AF stop position AFsp, processing of Step S212 is executed. In Step S212, the zoom position Zp is compared with the AF valid position AFon. When the zoom position Zp is not greater than the AF valid position AFon, the zoom position Zp is set to the AF stop position AFsp in Step S214, and then the processing returns to Step S203 and is repeated.

When the zoom position Zp is larger than the AF valid position AFon, the AF valid position AFon is set to the AF stop position AFsp in Step S213, and then the processing returns to Step S203 and is repeated.

In Step S207, the AF valid flag FLon is set to be invalid. Then, the processing returns to Step S203 and is repeated.

In Step S204, the panning state input from the image stabilizing control unit 22 is determined. During the panning, processing of Step S205 is executed. When the panning is not performed, the processing returns to Step S203 and is repeated. When the panning is determined, it is assumed that the subject is changed. In Step S205, the AF invalid position AFof is set as the AF stop position AFsp and the AF valid flag FLon is set to be valid. Then, the processing returns to Step S203 and the AF operation restarts.

When the zoom position Zp is larger than "(AF stop position AFsp)+(AF stop dead zone α)" in Step S206 and the AF valid flag FLon is valid, the autofocus operation is valid in Step S208. When the zoom position Zp is not larger than "(AF stop position AFsp)+(AF stop dead zone α)" in Step S206, it is assumed that the zoom position is shifted to the wide-angle side and the image of the same subject is being taken. Therefore, the autofocus operation is not performed and the AF valid flag FLon is set to be invalid in Step S207.

In Step S212, when it is determined that the zoom position Zp is larger than the AF valid position AFon, the autofocus operation is always valid. When the zoom position Zp is not larger than the AF invalid position AFof, the autofocus operation is always invalid.

When the zoom position Zp is shifted to a position closer to the telephoto side with respect to the AF stop position AFsp in Step S212 while the autofocus operation is valid, the AF stop position AFsp is reset as the zoom position Zp. Note that, when the zoom position Zp exceeds the AF valid position AFon, the AF stop position AFsp becomes the AF valid position AFon. During the panning operation, the AF valid flag FLon is set to be valid.

Therefore, using the autofocus system in the telephoto side on which the depth of focus shallows, of the magnification-varying lens unit 2, a high-precision focus adjustment on the specific subject intended by the image-taking person can be performed.

When the magnification-varying lens unit 2 is moved to the wide-angle side on which the depth of focus deepens, the autofocus operation is made invalid. Therefore, even when the multiple subjects are within the area for recognizing the focus state, the focus state on the specific subject may be maintained. When the panning operation is determined, the focus adjustment using the autofocus system may be performed again.

Embodiment 3

Figure 6:
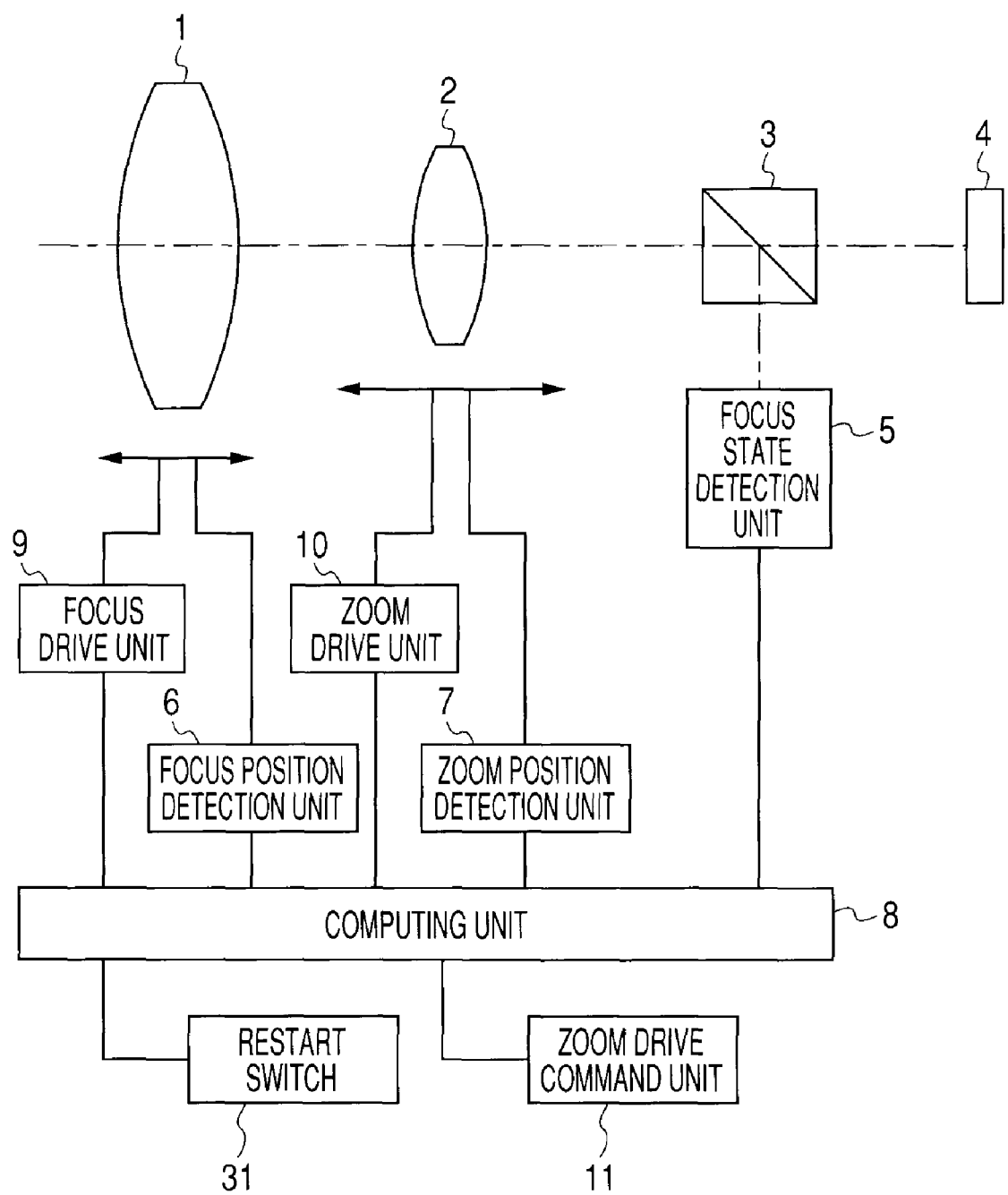
FIG. 6 is a block circuit structural diagram illustrating Embodiment 3 of the present invention.

FIG. 6 is a block circuit structural diagram illustrating an optical system and a control unit according to Embodiment 3. Unlike FIG. 1, the computing unit 8 is connected to a restart switch 31. The AF valid state is set after the detection of the image stabilizing operation in Embodiment 2, but the AF valid state is set by the restart switch 31 in Embodiment 3.

Figure 7:
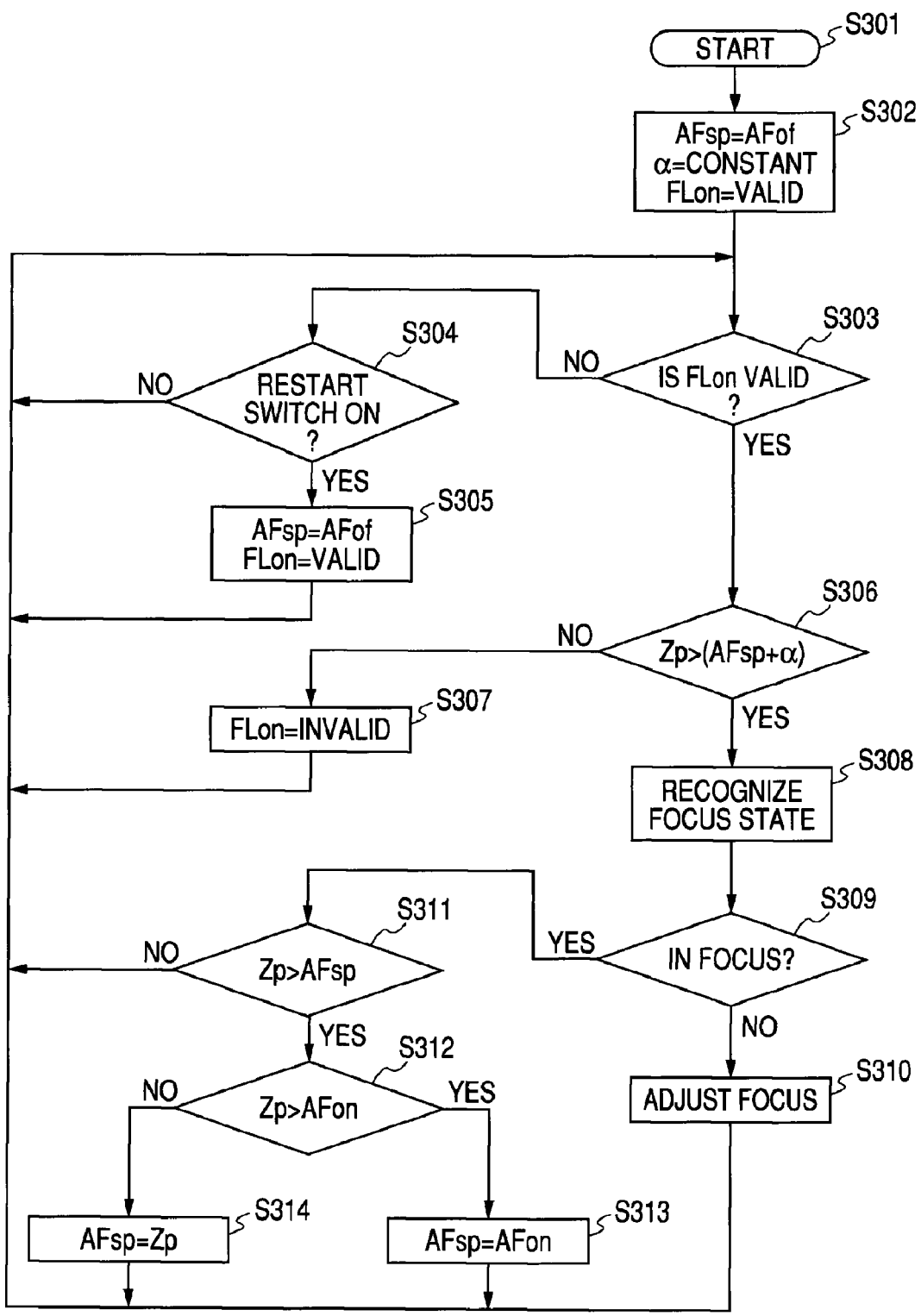
FIG. 7 is an operational flowchart illustrating Embodiment 3 of the present invention.

FIG. 7 is a flowchart illustrating an operation of the computing unit 8 according to Embodiment 3. According to the computing unit 8, in Step S302, the AF invalid position AFof is set as the AF stop position AFsp, a constant is set as the AF stop dead zone α, and the AF valid flag FLon is set to be valid.

When the AF valid flag FLon is valid in Step S303, processing of Step S306 is executed. When the AF valid flag FLon is invalid, processing of Step S304 is executed. In Step S306, the zoom position Zp is compared with "(AF stop position AFsp)+(AF stop dead zone α)". When the zoom position Zp is larger than "(AF stop position AFsp)+(AF stop dead zone α)", processing of Step S308 is executed. When the zoom position Zp is not larger than "(AF stop position AFsp)+ (AF stop dead zone α)", processing of Step S307 is executed.

In Step S308, the focus state obtained from the focus state detection unit 5 is recognized. Then, when it is determined in Step S309 that the focus point is in focus, processing of Step S311 is executed. When the focus point is not in focus, processing of Step S310 is executed. In Step S310, the focus lens unit 1 is driven for autofocus operation to perform the focus adjustment. Then, the processing returns to Step S303 and is repeated.

In Step S311, the zoom position Zp is compared with the AF stop position AFsp. When the zoom position Zp is not larger than the AF stop position AFsp, the processing returns to Step S303 and is repeated. When the zoom position Zp is larger than the AF stop position AFsp, processing of Step S312 is executed.

In Step S312, the zoom position Zp is compared with the AF valid position AFon. When the zoom position Zp is not larger than the AF valid position AFon, the zoom position Zp is set to the AF stop position AFsp in Step S314, and then the processing returns to Step S303 and is repeated. When the zoom position Zp is larger than the AF valid position AFon, the AF valid position AFon is set to the AF stop position AFsp in Step S313, and then the processing returns to Step S303 and is repeated.

In Step S307, the AF valid flag FLon is set to be invalid. Then, the processing returns to Step S303 and is repeated.

In Step S304, an ON or OFF state input from the restart switch 31 is determined. In a case of the ON state, processing of Step S305 is executed. In a case of the OFF state, the processing returns to Step S303 and is repeated. In Step S305, the AF invalid position AFof is set to the AF stop position AFsp and the AF valid flag FLon is set to be valid. Then, the processing returns to Step S303 and is repeated.

In the case where the flow chart illustrated in FIG. 7 is executed, when the zoom position Zp is larger than the AF valid position AFon in Step S312, the autofocus operation is always valid. When the zoom position Zp is not larger than the AF invalid position AFof, the autofocus operation is invalid.

When the zoom position Zp is larger than "(AF stop position AFsp)+(AF stop dead zone α)" in Step S306 and the AF valid flag FLon is valid, the autofocus operation is valid. Otherwise, the autofocus operation is invalid and the AF valid flag FLon is set to be invalid in Step S307.

When the zoom position Zp is shifted to a position closer to the telephoto side with respect to the AF stop position AFsp while the autofocus operation is valid, the AF stop position AFsp is reset as the zoom position Zp in Step S314. Note that, when the zoom position Zp exceeds the AF valid position AFon, the AF stop position AFsp is set as the AF valid position AFon in Step S313. When the restart switch 31 is recognized as ON in Step S304, the AF valid flag FLon is set to be valid in Step S305.

Therefore, using the autofocus system in the telephoto side on which the depth of focus shallows, of the magnification-varying lens unit 2, a high-precision focus adjustment on the specific subject intended by the image-taking person can be performed.

Even if the autofocus operation is made invalid when the magnification-varying lens unit 2 is moved to the wide-angle side on which the depth of focus deepens and the multiple subjects are within the area for recognizing the focus state, the focus state on the specific subject may be maintained. Further, the focus adjustment may be performed by the restart of the autofocus operation depending on the determination of whether or not the restart switch 31 is turned ON.

Embodiment 4

Figure 8:
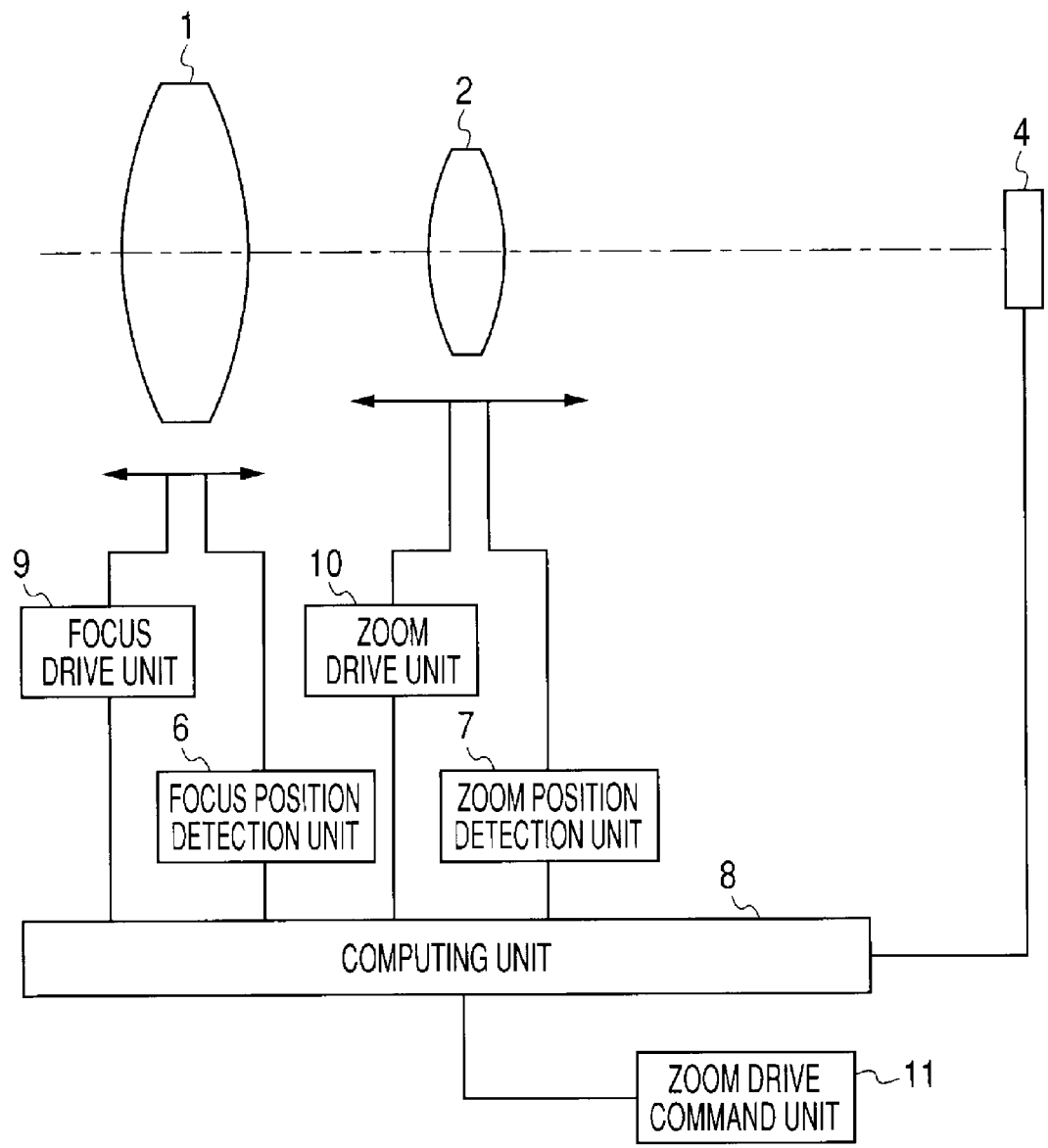
FIG. 8 is a block circuit structural diagram illustrating Embodiment 4 of the present invention.

FIG. 8 is a block circuit structural diagram illustrating an optical unit and a control unit in Embodiment 4. Unlike FIG. 1, the separation optical system 3 and the focus state detection unit 5 are omitted. In Embodiment 4 of the present invention, an image signal is used for the AF operation. An operation of the computing unit 8 for realizing Embodiment 4 of the present invention is described with reference to the operational flowchart illustrated in FIG. 3. The operation except for Step S109 is the same operation as in Embodiment 1.

In Step S109, the focus state is determined by the computing unit 8 based on the image signal input from the image pickup unit 4 instead of the focus state detection unit 5. The autofocus state in the case where the flowchart illustrated in FIG. 3 is executed is the same as in Embodiment 1.

In Embodiment 4 of the present invention, using the autofocus system in the telephoto side on which the depth of focus shallows, of the magnification-varying lens unit 2, a high-precision focus adjustment on the specific subject intended by the image-taking person can be performed.

Even if the autofocus operation is made invalid when the magnification-varying lens unit 2 is moved to the wide-angle side on which the depth of focus deepens and the multiple subjects are within the area for recognizing the focus state, the focus state on the specific subject may be maintained. Further, when the magnification-varying lens unit 2 is moved to the telephoto side on which the depth of focus shallows, the focus adjustment using the autofocus operation may be performed again.

Figure 9:
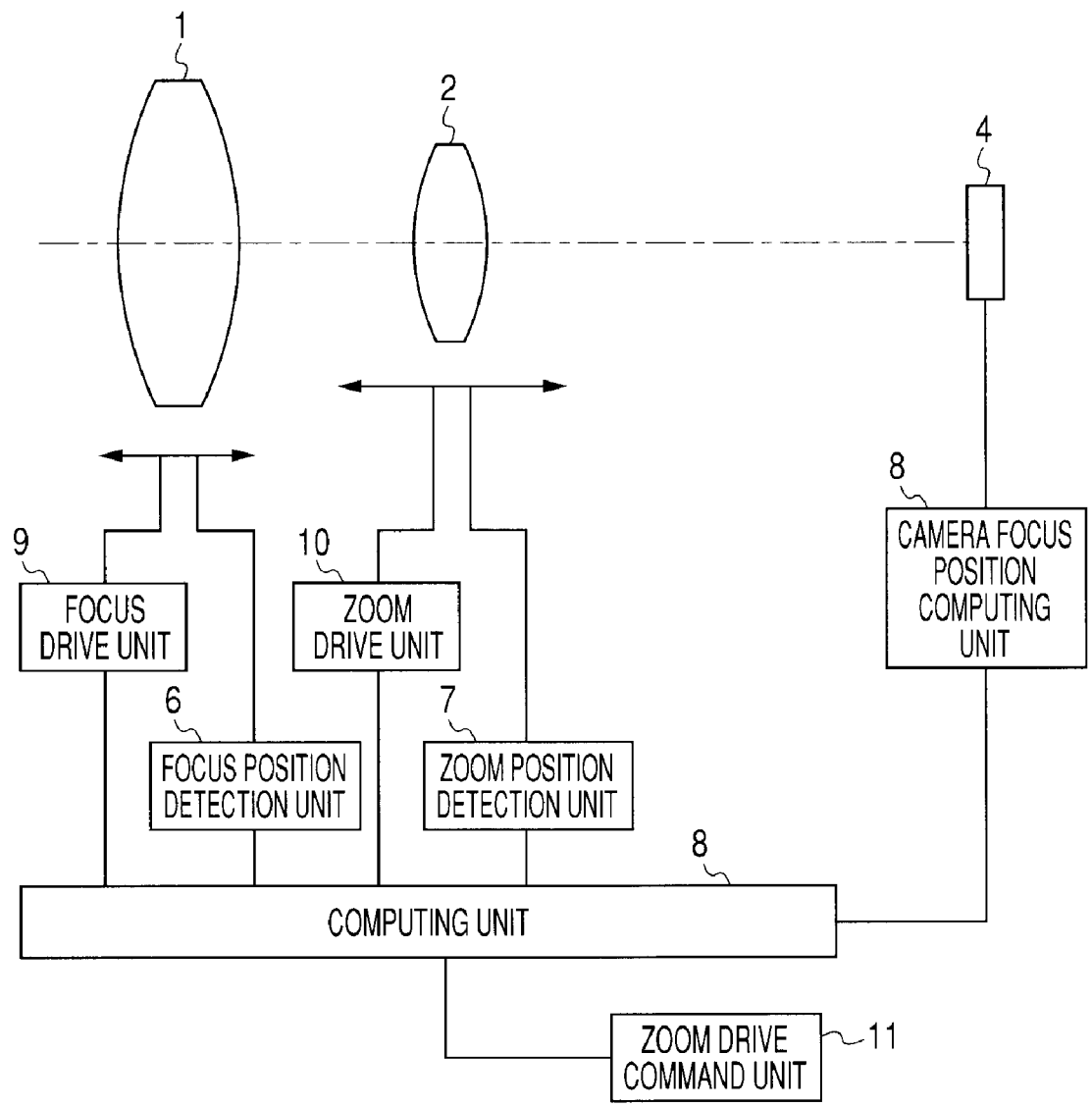
FIG. 9 is a block circuit structural diagram illustrating a modified example of Embodiment 4 of the present invention.

In Embodiment 4 of the present invention, the focus state is recognized based on the image signal input from the image pickup unit 4. However, as illustrated in FIG. 9, a camera focus position computing unit 41 may be separately inserted between the image pickup unit 4 and the computing unit 8.

An output of the image pickup unit 4 is connected to the camera focus position computing unit 41, and hence a focus state of the image pickup unit 4 may be recognized. When the focus state is input to the computing unit 8, the same effect can be obtained.

According to the focus lens apparatus in the present invention, even when the multiple subjects are within the area for recognizing the focus state, the high-precision focus adjustment may be performed on the specific subject of the multiple subjects which is intended by the image-taking person.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-239566, filed Sep. 18, 2008, which is hereby incorporated by reference herein in its entirety.

What is claimed is:

1. A zoom lens, comprising:
   a focus lens unit which moves during focusing;
   a magnification-varying lens unit which moves during zooming;
   a focus state detection unit for detecting a focus state in the zoom lens; and
   a focus drive unit for driving the focus lens unit based on a result of detection obtained by the focus state detection unit,
   wherein the focus drive unit drives the focus lens unit based on the result of detection obtained by the focus state detection unit when the magnification-varying lens unit is moved in a direction in which the depth of focus shallows, and the focus drive unit does not drive the focus lens unit when the magnification-varying lens unit is moved in the direction in which the depth of focus deepens.

2. A zoom lens according to claim 1, further comprising:
   a magnification-varying lens drive unit for driving the magnification-varying lens unit; and
   a control unit for controlling the focus drive unit and the magnification-varying lens drive unit,
   wherein the focus drive unit drives the focus lens unit based on a focus command signal generated by the control unit based on the result of detection obtained by the focus state detection unit when the magnification-varying lens unit is moved in a direction in which the depth of focus shallows, and
   wherein whether the magnification-varying lens unit is moved in the direction in which the depth of focus shallows or the direction in which the depth of focus deepens is determined based on a zooming command signal transmitted from the control unit to the magnification-varying lens drive unit.

3. A zoom lens according to claim 1, further comprising:
   a magnification-varying lens drive unit for driving the magnification-varying lens unit;
   a zoom position detection unit for detecting a position of the magnification-varying lens unit; and
   a control unit for controlling the focus drive unit and the magnification-varying lens drive unit,
   wherein the focus drive unit drives the focus lens unit based on a focus command signal generated by the control unit based on the result of detection obtained by the focus state detection unit when the magnification-varying lens unit is moved in a direction in which the depth of focus shallows, and
   wherein whether the magnification-varying lens unit is moved in the direction in which the depth of focus shallows or the direction in which the depth of focus deepens is determined based on a result of detection obtained by the zoom position detection unit from the control unit.

4. A zoom lens according to claim 1, further comprising a vibration detection unit,
   wherein when a vibration is detected by the vibration detection unit, an autofocus operation is performed by use of the focus state detection unit and the focus drive unit.

5. A zoom lens according to claim 1, wherein when at least one of the focus lens unit and the magnification-varying lens unit is located in a position in which the depth of focus is shallower than a predetermined threshold value, the focus operation using the focus lens unit is always performed.

6. A zoom lens according to claim 1, wherein when at least one of the focus lens unit and the magnification-varying lens unit is located in a position in which the depth of focus is deeper than a predetermined threshold value, the focus operation using the focus lens unit is stopped.

7. A zoom lens according to claim 1,
   wherein a case where the magnification-varying lens unit is moved in a direction in which the depth of focus shallows is a case where the magnification-varying lens unit is moved to a telephoto side, and
   wherein a case where the magnification-varying lens unit is moved in the direction in which the depth of focus deepens is a case where the magnification-varying lens unit is moved to a wide-angle side.

8. A camera, comprising:
   an image pickup element; and
   a zoom lens for guiding a beam from a subject to the image pickup element,
   wherein the zoom lens includes:
      a focus lens unit which moves during focusing;
      a magnification-varying lens unit which moves during zooming,
      a focus state detection unit for detecting a focus state in the zoom lens; and
      a focus drive unit for driving the focus lens unit based on a result of detection obtained by the focus state detection unit,
      wherein the focus drive unit drives the focus lens unit based on the result of detection obtained by the focus state detection unit when the magnification-varying lens unit is moved in a direction in which the depth of focus shallows, and the focus drive unit does not drive the focus lens unit when the magnification-varying lens unit is moved in the direction in which the depth of focus deepens.

9. A zoom lens having an autofocus function,
   wherein when the zoom lens is zoomed in a direction in which a depth of focus shallows, the autofocus function is set to be valid, and
   wherein when the zoom lens is zoomed in a direction in which the depth of focus deepens, the autofocus function is set to be invalid, and
   wherein the zoom lens includes:
      a focus lens unit which moves during focusing;
      a magnification-varying lens unit which moves during zooming;
      a focus state detection unit for detecting a focus state in the zoom lens; and a focus drive unit for driving the focus lens unit based on a result of detection obtained by the focus state detection unit, wherein the focus drive unit drives the focus lens unit based on the result of detection obtained by the focus state detection unit when the magnification-varying lens unit is moved in a direction in which the depth of focus shallows, and the focus drive unit does not drive the focus lens unit when the magnification-varying lens unit is moved in the direction in which the depth of focus deepens.

10. A camera having an autofocus function, comprising:

an image pickup element; and a zoom lens for guiding a beam from a subject to the image pickup element, wherein when the zoom lens is zoomed in a direction in which a depth of focus shallows, the autofocus function is set to be valid, and wherein when the zoom lens is zoomed in a direction in which the depth of focus deepens, the autofocus function is set to be invalid, and wherein the zoom lens includes:
  a focus lens unit which moves during focusing;
  a magnification-varying lens unit which moves during zooming;
  a focus state detection unit for detecting a focus state in the zoom lens; and
  a focus drive unit for driving the focus lens unit based on a result of detection obtained by the focus state detection unit,
  wherein the focus drive unit drives the focus lens unit based on the result of detection obtained by the focus state detection unit when the magnification-varying lens unit is moved in a direction in which the depth of focus shallows, and the focus drive unit does not drive the focus lens unit when the magnification-varying lens unit is moved in the direction in which the depth of focus deepens.

11. A zoom lens comprising:

a focus lens unit which moves during focusing;

a magnification-varying lens unit which moves during zooming;

a focus state detection unit for detecting a focus state in the zoom lens;

a focus drive unit for driving the focus lens unit based on a result of detection obtained by the focus state detection unit;

a magnification-varying lens drive unit for driving the magnification-varying lens unit; and a control unit for controlling the focus drive unit and the magnification-varying lens drive unit, wherein the focus drive unit drives the focus lens unit based on a focus command signal generated by the control unit based on the result of detection obtained by the focus state detection unit when the magnification-varying lens unit is moved in a direction in which the depth of focus shallows, and the focus drive unit does not drive the focus lens unit when the magnification-varying lens unit is moved in the direction in which the depth of focus deepens, and wherein whether the magnification-varying lens unit is moved in the direction in which the depth of focus shallows or the direction in which the depth of focus deepens is determined based on a zooming command signal transmitted from the control unit to the magnification-varying lens drive unit.

12. A zoom lens comprising:

a focus lens unit which moves during focusing;

a magnification-varying lens unit which moves during zooming;

a magnigication-varying lens drive unit for driving the magnification-varying lens unit;

a focus state detection unit for detecting a focus state in the zoom lens;

a focus drive unit for driving the focus lens unit based on a result of detection obtained by the focus state detection unit;

a zoom position detection unit for detecting a position of the magnification-varying lens unit; and a control unit for controlling the focus drive unit and the magnification-varying lens drive unit, wherein the focus drive unit drives the focus lens unit based on a focus command signal generated by the control unit based on the result of detection obtained by the focus state detection unit when the magnification-varying lens unit is moved in a direction in which the depth of focus shallows, and the focus drive unit does not drive the focus lens unit when the magnification-varying lens unit is moved in the direction in which the depth of focus deepens, and wherein whether the magnification-varying lens unit is moved in the direction in which the depth of focus shallows or the direction in which the depth of focus deepens is determined based on a result of detection obtained by the zoom position detection unit from the control unit.

* * * * *